US006726174B2

(12) United States Patent
Bareis et al.

(10) Patent No.: US 6,726,174 B2
(45) Date of Patent: Apr. 27, 2004

(54) CONTROL VALVE, ESPECIALLY FOR AN INTERNAL COMBUSTION ENGINE, FOR THE CONTROLLED RECYCLING OF EXHAUST GASES

(75) Inventors: Bernd Bareis, Utzstetten (DE); Mathias Elsaesser, Neuhausen (DE); Franz Bender, Wendlingen (DE)

(73) Assignee: Gustav Wahler GmbH U. Co. KG, Esslingen (DE)

( * ) Notice: Subject to any disclaimer, the term of this patent is extended or adjusted under 35 U.S.C. 154(b) by 0 days.

(21) Appl. No.: 10/323,015

(22) Filed: Dec. 19, 2002

(65) Prior Publication Data

US 2003/0160199 A1 Aug. 28, 2003

(30) Foreign Application Priority Data

Feb. 23, 2002 (DE) ........................................ 102 07 922

(51) Int. Cl.[7] .......................... F16K 3/16; F16K 25/00; F16K 29/00

(52) U.S. Cl. ........................ 251/205; 137/243; 251/206

(58) Field of Search ................................ 251/205–209; 137/242–243

(56) References Cited

U.S. PATENT DOCUMENTS 3,834,416 A * 9/1974 Parkison ..................... 251/304
4,554,943 A * 11/1985 Claney et al. .............. 137/242
4,587,989 A * 5/1986 Mayhew, Jr. ............... 251/208
4,674,537 A * 6/1987 Bergmann .................. 251/208
4,923,167 A * 5/1990 Schmidt ..................... 251/205
5,417,083 A * 5/1995 Eber .......................... 251/205
5,836,296 A * 11/1998 Hillis et al. ................. 251/208

FOREIGN PATENT DOCUMENTS

DE 42 04 434 8/1993

* cited by examiner

*Primary Examiner*—Paul J. Hirsch
(74) *Attorney, Agent, or Firm*—Jordan and Hamburg LLP

(57) ABSTRACT

The invention relates to an exhaust gas control valve with a first valve part (14) and a second valve part (44), which rest on one another with one side (17, 46), the valve parts (14, 44) in each case having passages (14, 45) and being rotatable relative to one another between an open position permitting the passage of exhaust gases and a closed position, blocking this passage. Webs (21 to 23), which protrude on one axial side of the first valve part (14), surround the openings (15) and, with their free narrow surfaces, form supporting surfaces for the second valve part (44), which is constructed flat on its side (46) facing the first valve part (14) and essentially rests with this surface on the narrow surfaces of the webs (21 to 23) and slides during the relative rotational adjustment, extend along the boundary edges (18 to 20), surrounding the passages (15, 45) of the first valve part (14).

42 Claims, 5 Drawing Sheets

Figure 1:
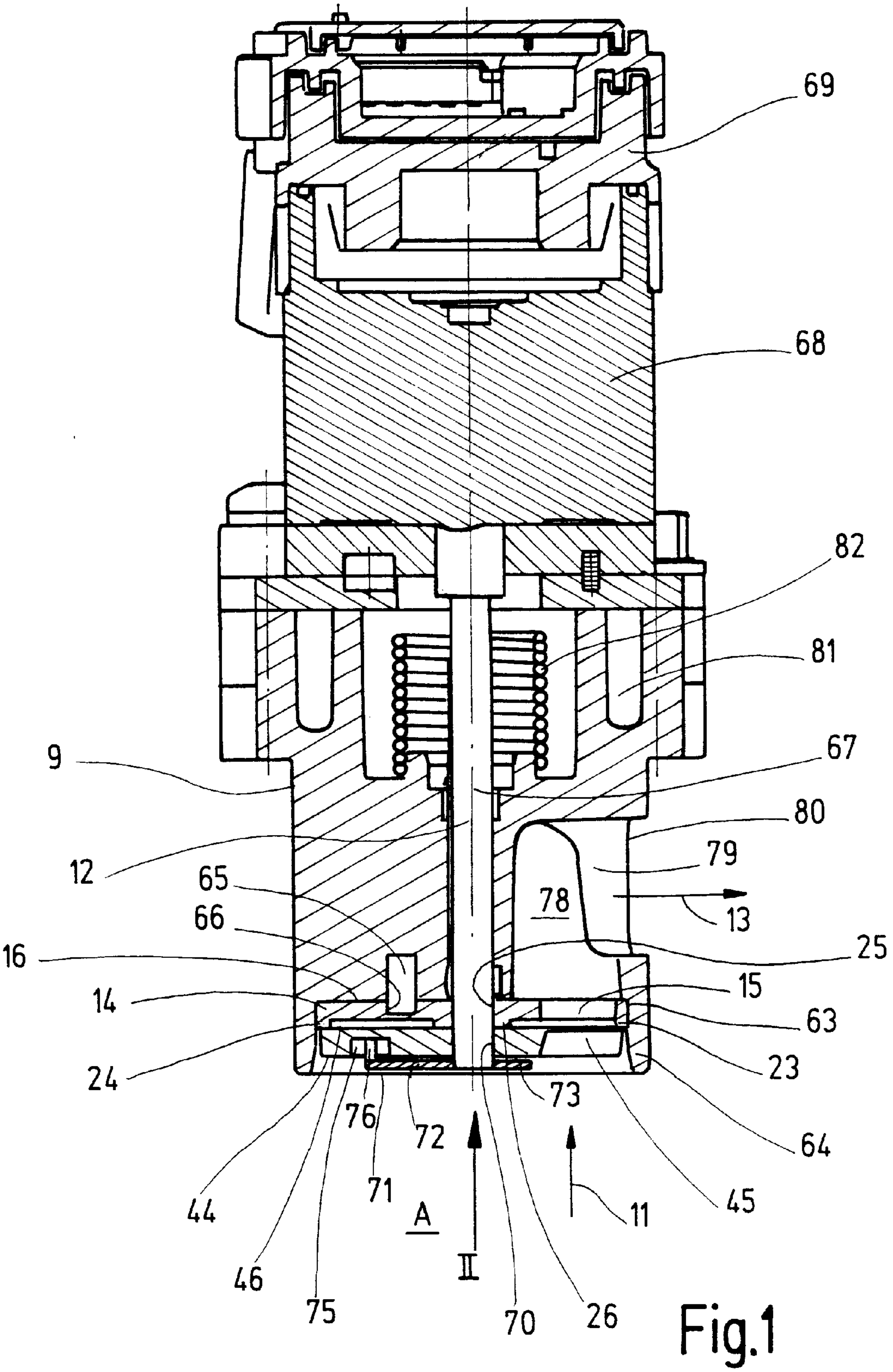

CONTROL VALVE, ESPECIALLY FOR AN INTERNAL COMBUSTION ENGINE, FOR THE CONTROLLED RECYCLING OF EXHAUST GASES

The invention relates to a control valve, especially for an internal combustion engine, for the controlled recycling of exhaust gases to the fresh gas of the internal combustion engine, with the distinguishing features in the introductory portion of claim 1.

A control valve for recycling exhaust gases into the intake manifold of an internal combustion engine of this type is known (DE 42 04 434 C2), for which the first valve part may be constructed as a flat slide valve, which interacts with a flat seat of the outlet opening of the exhaust gas pipeline, the flat seat of the outlet opening and the flat slide valve being disposed in an expansion of the exhaust gas channel of the valve housing. The flat slide valve is moved over a rod by control equipment, such as electromagnetic control element, against a spring in the opening direction, the spring, in the unactivated position of the control equipment, bringing the flat slide valve into the closed position, so that exhaust gas is not recycled then. The flat seat and flat slide valve are made from materials with low friction properties, so that the adjusting force required is small. The flat slide valve contains only a slide valve opening, which, in the open position, is caused to overlap the outlet opening, the slide valve opening determining the cross section of flow of the outlet opening. Alternatively, the exhaust gas can also be recycled to the individual cylinders of the internal combustion engine over individual exhaust gas pipelines. In the latter case, the flat slide valve has a slide valve opening for each individual exhaust gas pipeline, in which there is an outlet opening. The flat slide valve is shifted in the direction of its areal extent and transversely to the advancing exhaust gas by means of the rod over the control device between the open position and the closed position. The flat slide valve rests two-dimensionally on the end of the exhaust gas pipeline, which is directed transversely thereto, this end containing the outlet opening. The exhaust gas, supplied into the exhaust gas channel, upstream from the flat slide valve, strikes the latter transversely and, in the open position of the flat slide valve, after passing through the slide valve opening, reaches the exhaust gas pipeline directed in exactly the same direction. Admittedly, in said publication, it is noted that the flat slide valve, which is actuated back and forth translatorily, can also be constructed as a rotating flat slide valve. However, no information is provided concerning the arrangement and rotary actuation of such a flat slide valve. In particular, this known flat slide valve has the disadvantage that, when in operation, soot and similar particles can deposit, cake on and thus adhere to the flat seat with the outlet opening, as well as to the flat slide valve with the slide valve opening of the latter and the adjoining areas and affect the satisfactory operation of the control valve and, after some time, make such an operation completely impossible. From this, it follows that, already after a relatively short period of use of the control valve, the adjustment of the flat slide valve becomes difficult. Because of this, a control device is required, which makes relatively large adjusting forces possible. Such a control device requires relatively much space, is heavy and expensive.

It is an object of the invention to configure a control valve of the type mentioned above as a rotary slide valve of such a type, that a slight rotational adjusting force is required for adjusting the rotatable part of the valve. As a result, the control device can be configured small, compact, light and relatively inexpensive and, furthermore, not only is slight friction ensured between the parts of the valve, which can be rotated relative to one another, and smooth running during the rotational adjustment, but also a permanent collection of soot or of similar particles, which could affect the mode of operation, is counteracted.

Pursuant to the invention, this objective is accomplished for a control valve of the type mentioned above by the distinguishing features of claim 1. By these means, it is achieved that the surfaces, on which the two parts of the valve are in contact with one another and slide during the adjustment between the closed position and the open position, are reduced to narrow surfaces. This enables the two parts of the valve to move easily relative to one another and, with that, to be adjusted quickly. Furthermore, any wear is only slight. The ease of the adjusting motion makes it possible to use a control device, which is small, light, compact and relatively inexpensive. It is furthermore of advantage that, because of the narrow surfaces of the one valve part, on which the other valve part rests and slides during the relative adjustment, edges, which may be relatively sharp, are created in the case of the narrow surfaces and, during the sliding motion, act similarly to a scraping tool in such a manner, that any adhering particles, such as soot or the like, are shaved off, scratched off or removed in some other way during the sliding motion, before they can cake on firmly. Removal of these particles by chipping off is also favored by these means. Furthermore, the inventive control valve is small, compact, light and relative inexpensive. The small construction and the few individual parts used result in a low weight and small manufacturing costs. Furthermore, the control valve is operationally reliable and has a long service life. It is furthermore of advantage that the control valve is not only insensitive to contamination, but also makes possible a highly accurate adjustment. Furthermore, the valve has only slight leaks and the adjusting force or torque, required actuate the valve, remains constant over the service life of the control valve.

Further, special distinguishing features and developments of the invention arise out of the dependent claims.

Further details and advantages of the invention arise, moreover, out of the following specification.

The complete wording of the claims is not given above merely to avoid unnecessary repetition. Instead, it is merely referred to by reference to the claims. However, by such reference, they are to be regarded as having been disclosed at this place explicitly as essential elements of the invention. Moreover, all distinguishing features mentioned above or below in the specification, as well as the distinguishing features, which may be inferred only from the drawings, are further components of the invention, even if they are not emphasized especially and, in particular, if they are not mentioned in the claims.

Figure 2:
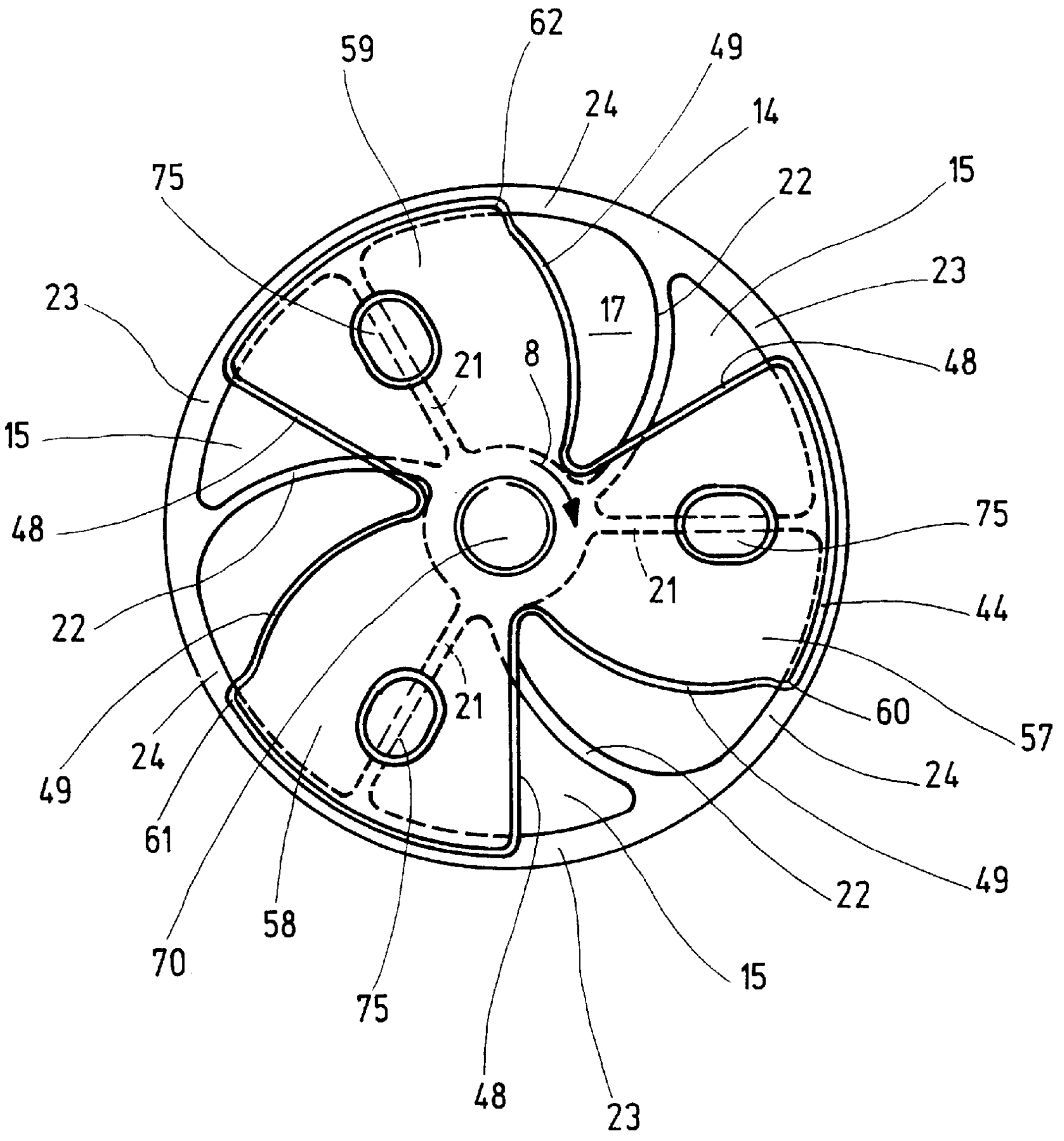
Figure 4:
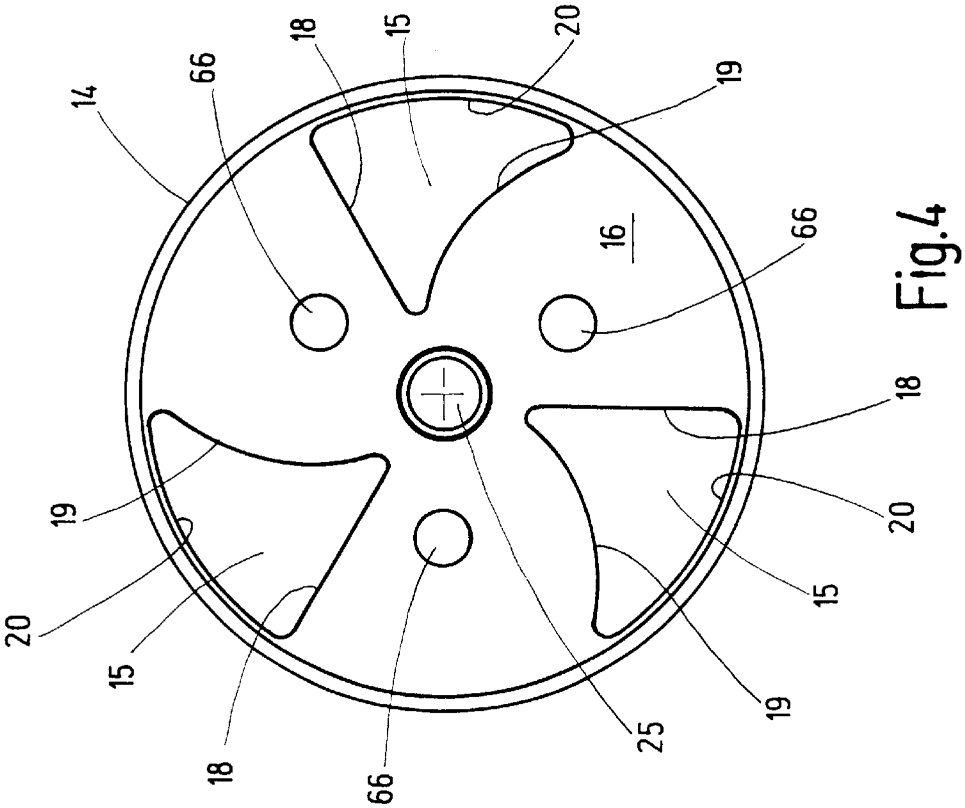
Figure 3:
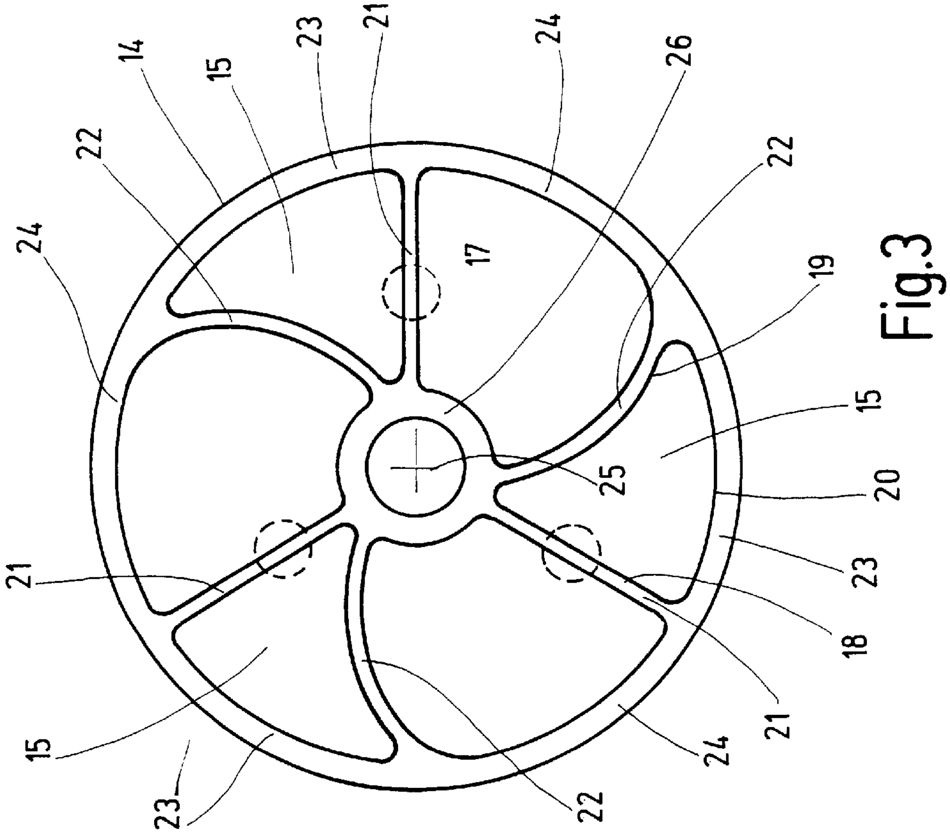
Figure 6:
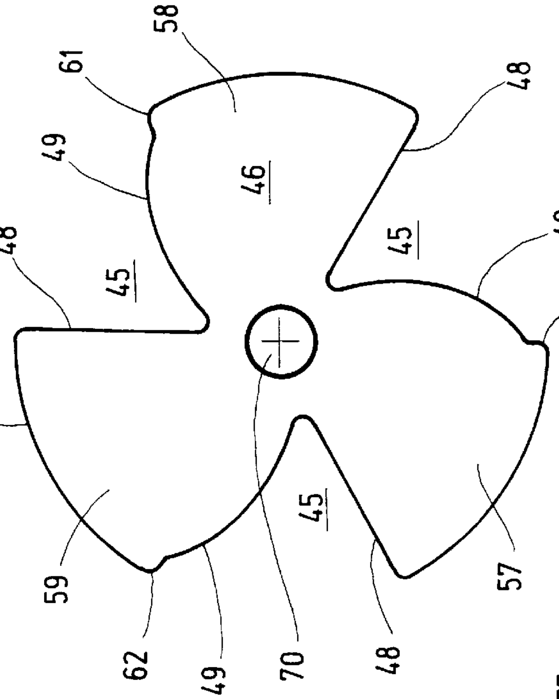
Figure 7:
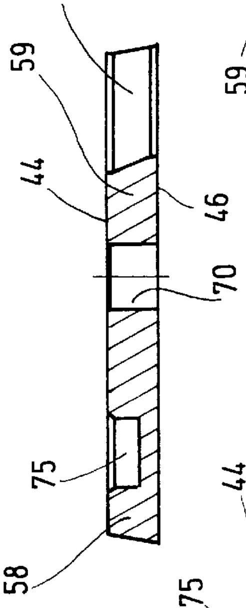
Figure 5:
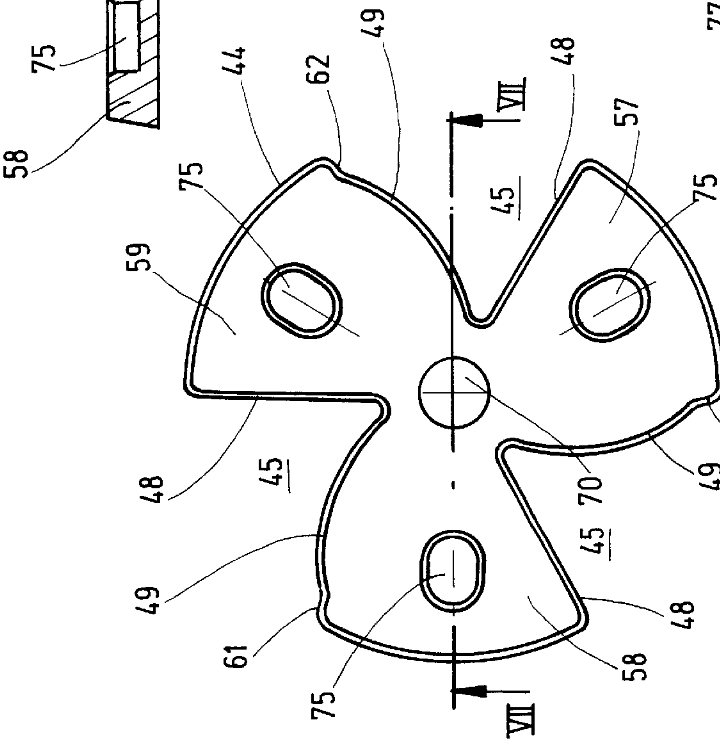
Figure 9:
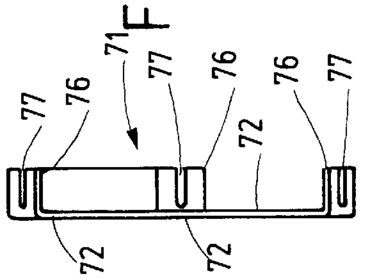
Figure 10:
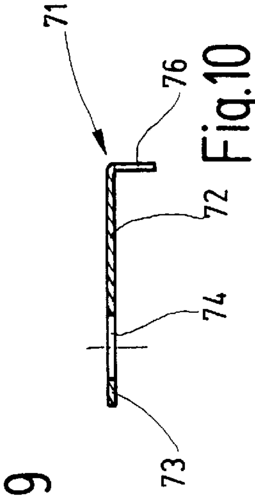
Figure 8:
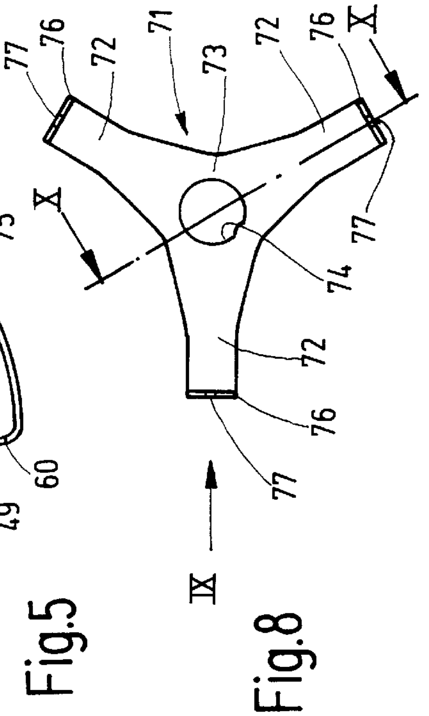
Figure 11:
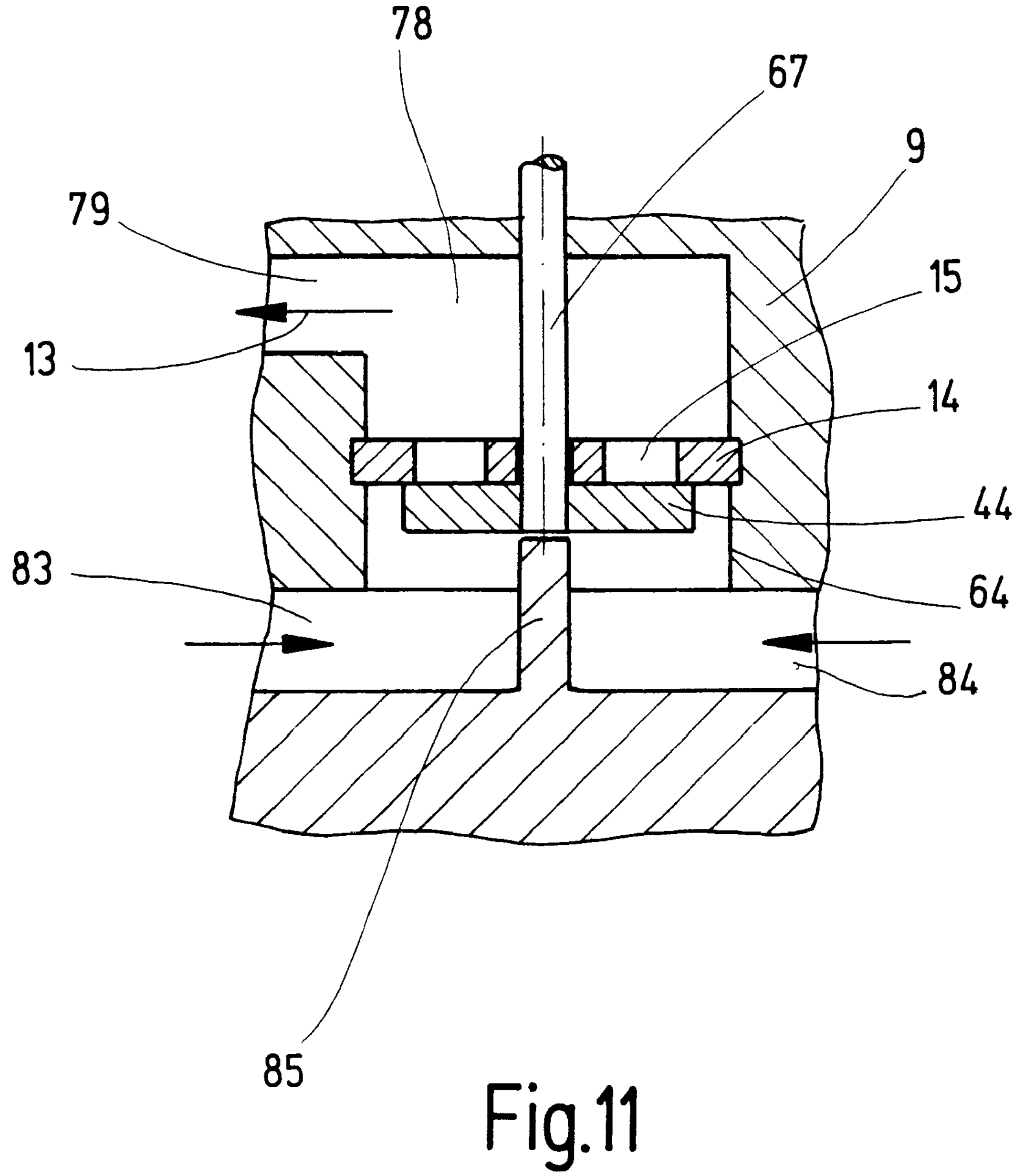

The invention is described in greater detail in the following by means of examples shown in the drawings, in which FIG. 1 shows a diagrammatic vertical section of a first example of a control valve for recycling exhaust gases in the open position, FIG. 2 shows an enlarged, diagrammatic plan view in the direction of arrow II in FIG. 1 of the two valve parts of the control valve in a partially open position, FIGS. 3 and 4 show a diagrammatic front view and rear view respectively of the first valve part in FIG. 2, FIGS. 5 and 6 show a diagrammatic front view and rear view of the second valve part in FIG. 2, FIG. 7 shows a diagrammatic section along the line VII—VII in FIG. 5, FIG. 8 shows a diagrammatic rear view of the connecting element in FIG. 1, FIG. 9 shows a diagrammatic side view of the connecting element in the direction of arrow IX in FIG. 8, FIG. 10 shows a diagrammatic section along the line X—X in FIG. 8 and FIG. 11 shows a diagrammatic vertical section only of the lower part of a control valve for exhaust gases of a second example.

In the drawings and especially in FIG. 1, a control valve 10, especially for an internal combustion engine, of a first example is shown in the open position. The control valve 10 is intended for the controlled recycling of exhaust gases, which are supplied in the lower region A of FIG. 1 and, moreover, to the front end of the control valve 10, for example, parallel to the axis as indicated by arrow 11, from an exhaust gases recycling pipeline, which is not shown, pass through the control valve 10 and leave the latter transversely to the longitudinal median axis 12 at a peripheral side corresponding to arrow 13 and are admixed over a pipeline, the details of which are not shown, with the fresh gas of the internal combustion engine. Such exhaust gas recycling valves are customary in internal combustion engines.

The control valve 10 has a first valve part 14 and a second valve part 44, which are disposed at the, in FIG. 1, lower end of the housing 9 and, with one side, lie one upon the other. Both valve parts 14, 44 have passages 15 and 45. They can be rotated relative to one another about the longitudinal median axis 12 between an open position, which is shown in FIG. 1 and permits the passage of exhaust gases supplied in the direction of arrow 11 and a closed position, which blocks this passage and is not shown. Both valve parts 14, 44 are essentially panel-shaped, the first valve 14 being stationary and the second valve 44 being disposed, so that it can be rotated relative to the first. In the case of a different example, which is not shown, the relationships can also be exchanged. The second valve part 44 represents a rotary slide valve, because it can be adjusted by rotation.

As can be seen particularly in FIGS. 2 and 3, the area, which extends between two passages, which follow one another in the peripheral direction, is closed in the case of the first valve part 14. The first valve part 14 has an essentially smooth, flat back side 16, which is visible particularly in FIG. 4. The opposite, front side 17 of the first valve part 14, which points downward and to the second valve part 44, is constructed depressed in the region of the surfaces, which extend between two passages 15 following one another in the circumferential direction. Webs 21, 22 and 23, which form the boundary of the passages 15 and protrude over lower surfaces of the front side 17, extend along the boundary edges 18, 19 and 20, which define the limits of a passage 15. With their narrow surfaces, all of which extend within a radial plane, these webs 21, 22 and 23 form supporting surfaces for the second valve part 44, which is constructed flat and smooth on its back side 46, facing the first valve part 14, and rests with this flat surface on said narrow surfaces of the webs 21, 22 and 23 and, during the relative rotational adjustment, slides between the open position and the closed position.

The first valve part 14 is constructed as a circular disk. It has an annular land 24, which extends along the circular edge, and, in the center, a passage borehole 25, which is surrounded by an annular hub 26. The ring land 24 and the annular hub 26 protrude in the same direction and as far as the webs 21, 22 and 23 and, with their respective narrow surface, also form a supporting surface for the second valve part 44, which rests and slides with its back side 46 thereon.

The passages 15 of the first valve part 14 and the passages 45 of the second valve part 44 are constructed approximately as triangular segments and in such a manner, so that two sides of the triangle, which correspond approximately to the boundary edges 18 and 19 of the passages 15, are directed essentially radially from the center and the further side of the triangle, which is specified approximately by the arc-shaped boundary edge 20, is formed by the corresponding arc section of the circular edge. The passages 15 of the first valve part 14 extend so far in the radial direction, that the web 23 there coincides with the ring land 24 in this region. Accordingly, in the region of the passages 15, the encircling ring land 24 forms their arc-shaped webs 23.

The one radial, triangular side of the passages 15 of the first valve part 14, which is specified by the boundary edge 18, extends in a straight line and approximately along a diameter, crossing the center of the passage borehole 25. In the case of the examples shown, the first valve part 14 has a total of three passages 15, which are at identical angular distances from one another, so that the linear boundary edges 18 follow one another at angular distances of 120°.

The other approximately radial triangular side, which is specified by the boundary edge 19, extends arc-shaped and not in a straight line and, as shown in FIGS. 3 and 4, and is arched in the direction of the linear boundary edge 18. By means of this arching of the boundary edge 19, and with that, of the assigned web 22 within the plane of the first valve part 14, a particularly advantageous progressivity of the passage characteristic curve is achieved for the transition from the closed position of the control rod 10 to the open position by the rotational adjustment of the second valve part 44 in the direction of arrow 8.

For the first valve part 14, the annular land 24 and/or the hub 26 and/or the webs 21, 22 and 23 are constructed with a sharp edge at least along one edge. For example, the edges of the webs 21 and 22 may be sharp. The outer edge of the annular hub 26, as well as the inner edge of the arc-shaped web 23 can also be constructed with sharp edges. Due to this sharp-edged construction, together with the smooth back side 46 of the second valve part 44, not only is a good seal achieved along the webs 22 and 23 when the valve part 44 is rotated into the open direction, as indicated by arrow 8, or in the opposite, closed direction, but also a good scraping action, similar to that attained with a scraping tool, by means of which any particles, such as soot or the like, adhering to the narrow surface of the webs 22 and 23, are removed.

With respect to their shape, size and spatial arrangement, the passages 45 of the second valve part 44 correspond to those of the first valve part 14, so that this description is referred to. The boundary edge 18, which extends in a straight line in the direction of a diameter, corresponds to the boundary edge 48 of the second valve part 44. The boundary edge 49 of the second valve part 44, pre-arched to the linear boundary edge 48 within the valve plane, corresponds to the other, pre-arched boundary edge 19 of the first valve part 14. The boundary edge 20, which forms the radial boundary of the passages 15 of the first valve part 14, is omitted for the second valve part, because the latter is constructed as a wing disk, which has three wings in the case of three passages 45, which follow one another at identical angular distances in the circumferential direction. Accordingly, the passages 45 are open radially towards the outside and, as a result, constructed as approximately V-shaped spaces between two wings 57, 58 and 59, succeeding one another in the circumferential direction. The second valve part 44, resting with its smooth back side 46 on the narrow surfaces of the webs 21 to 24 and the annular hub 26, can be rotated relative to the first valve part 14 from a closed position, which is not shown and in which each wing 57, 58 and 59 covers completely and closes tightly a passage 15 of the first valve part 14, in the direction of arrow 8 into an open position, and conversely, back into the closed position. Since the back side of the second valve part 44 rests only on the narrow surfaces of the webs 21 to 24 and of the annular hub 26, there is only a small area of contact between the two valve parts 14 and 44, as a result of which, on the one hand, a good closed position and, on the other, a smooth rotational adjustment into the open position and, conversely, into the closed position, is possible. Because of the only narrow contact surfaces, which are provided for the first valve part 14 in the form of narrow surfaces, any deposits could be formed only on these small, slight surfaces. Furthermore, the advantage exists that such possible deposits, such as adhering soot, could be detached in scraping fashion by the rotational adjustment of the second valve part 44 and, with that, removed. Starting out from the closed state of the control valve 10, in which a wing 57, 58 and 59 of the second valve part 44 completely covers a corresponding passage 15, the arc-shaped boundary edge 49 initially passes over the recessed surface region of the front side 17, while the linearly extending boundary edge 48 on the back side of the second valve part 44 heads for the passages 15 of the first valve part 14 and specifies the increasing size of the cross section of the respective passage 15 by appropriately freeing the region between the webs 22 and 23 until finally, in the completely open position, the linear boundary edge 48 proceeds congruently with the web 21. During this movement in the opening direction, the part of the annular land 24, which is in the shape of a circular section and extends between two consecutive passages 15, is scraped free on its narrow surface. During the shifting into the closed position, which takes place in a direction opposite to that of arrow 8, the linear boundary edges 48 move over the narrow surfaces of the arc-shaped webs 23 and 22, which are cleaned in scraping fashion in a similar manner. As is evident particularly from FIGS. 5 and 6, the second valve part, at the radially outer transition region of the arc-shaped boundary edge 49, in the adjoining edge, which is in the shape of a circular section, has a nose 60, 61 and 62, which protrudes in the direction of rotation and slides on the narrow surface of the annular land 24 during the movement into the open position and has a particularly good cleaning effect, similar to that of a scraping tool. The boundary edges 48 and 49 may have a sharp edge on the back side 46.

At the front side of the housing 9, which is at the bottom in FIG. 1, the first valve part 14 is inserted in or pressed into an annular seat 63. The valve part 14 preferably is fastened so that it can be detached and exchanged for one with a different geometry of the passages 15, so that the characteristic throughput line and, for example, the maximum throughput of the control valve 10 can easily be changed by these means. At the, in FIG. 1, lower end, the housing 9 has at least one projection or edge 64, which protrudes so far, that it also protrudes over the second valve 44, which rests with its back side 46 on the first valve part 14 and protrudes in such a manner, that both valve parts 14 and 44 are protected by this protruding edge or protruding projections.

On the side averted from the second valve part 44, the first valve part 14 is prevented from rotating with respect to the housing 9 by means of positive connecting means 65, 66. As such connecting means, at least one projection 65, parallel to the axis, and seats 66 of the housing 9 or of the first valve part 14 are provided, which engage one another during the insertion of the first valve part 14 into the annular seat 63. In the case of the example shown, a projection 65 is provided on the housing side and three seats 66, in the form of blind boreholes, one of which interacts with the projection 65, are provided on the back side 16 of the first valve part 14.

An adjusting shaft 67, which can be driven by a driving device 68, such as a rotating magnet, rotationally adjusts the second valve part 44. Furthermore, an electronic device 69 with a position indicator, which is shown only diagrammatically, is a component of the driving device 68. The driving device 68 is fastened to the upper region (FIG. 1) of the housing 9. In the case of an example, which is not shown, the adjusting shaft 67 may consist of two coaxial parts, which are connected with one another by a coupling, or, in a particularly advantageous manner corresponding to the first example in FIG. 1, configured as a component which, starting out from the driving device 68, can extend, without a coupling, up to the lower end of the control valve 10 in FIG. 1 and the second valve part 44 there and beyond. The second valve part 44 is held floating, preferably detachably and exchangeably, in relation to the housing 9 and the adjusting shaft 67. The adjusting shaft 67 passes through the boreholes 25 in the first valve part 14 and, moreover, through a central boreholes 70, which is in the second valve part 44 and also serves to center the latter in relation to the adjusting shaft 67. Outside of the second valve part 44, this is connected with the end of the adjusting shaft 67.

With particular advantage, the first valve part 14 and/or the second valve part 44 are formed from ceramic, both valve parts advantageously consisting of ceramic in the case of the example shown. It has been recognized that ceramic materials are inert and unreactive and do not attract soot or other particles as strongly as do metallic materials. Admittedly, soot and other particles can also adhere to ceramics; however they can be removed more easily from these or chip off more easily. Accordingly, owing to the fact that both valve parts 14 and 44 consist of ceramic, any undesirable adhesion and baking on of soot and similar particles is prevented. The surfaces in contact, that is, the back side 46 of the second valve part 44 and the narrow surfaces of the webs 21 to 24 and of the annular hub 26 and of the valve parts 44 and 14, when constructed of ceramic, advantageously have different roughnesses, in order to prevent any adhesion of the contacting surfaces. For example, the narrow surfaces of the first valve part 14 may have a lesser roughness than the surface 46 of the second valve part 44 resting thereon. The narrow surfaces of the webs 21 to 24 and of the annular hub 26 are ground and polished and therefore smoother than the back side 46 of the other valve part 44, as a result of which adhesion is counteracted and, consequently, the adjusting forces, which must be applied by the driving device 68 for the adjusting movement of the second valve part 44 are reduced even further. As a result, the driving device 68 can be even smaller and lighter and, under certain circumstances, produced even less expensively.

If the second valve part 44 is constructed from ceramic, it cannot be connected to the adjusting shaft 67 by welding or soldering. A floating arrangement, which makes possible an essentially tolerance-free rotational locking between the adjusting shaft 67 and the second valve part 44 as well as a large tolerance range, is achieved owing to the fact that a connecting element 71 is fastened to the end of the adjusting shaft 67. The fastening may be detachable or also permanent, for example, by welding or soldering. The connecting element 71 overlaps the outside of the second valve part 44, averted from the first valve part 14, and is rotationally locked with the second valve part 44. In general, the second valve part 44 is pressed by means of an axial spring force, which is directed towards the first valve part 14, against the front side 17, and moreover against the narrow surfaces of the webs 21 to 24 and of the annular hub 26. This can be achieved by a spring, which acts axially on the adjusting shaft 67 or on a part of the adjusting shaft. On the other hand, in the case of the first example shown, the connecting element 71 itself is constructed as a spring element, such as a leaf spring, by means of which even the axial force of the spring is exerted on the second valve part 44. This has the advantage that an adjusting shaft 67, extending from the driving device 68 up to the lower end (FIG. 1) of the control valve 10, can be used, so that it is possible to do without a divided adjusting shaft with a coupling between the two parts and without a special, spring exerting an axial contacting pressure. The connecting element 71, constructed as a spring element, has several, such as three radially protruding, leaf spring-like arms 72 and a practically inelastic center 73. In the latter, there is a borehole 74, through which the end of the adjusting shaft 67 extends, which in this region is connected nonrotationally with the connecting element 71. In relation to the center 73, the arms 72 are relatively narrow and therefore, if the connecting element 71 has thin walls, can deflect well, so that the connecting element 71 can engage the second valve part 44 with a certain axial pre-tension in the installed position.

On the outside, pointing downward in FIG. 1, the second valve part 44 has seats 75, which are constructed, for example, as radially directed blind elongated holes. To these seats 75, lugs 76 of approximately the same width are assigned, which are provided at the connecting element 71 and are disposed at the ends of the arms 72, from which they protrude approximately at right angles, and, at the same time, and engage the seats 75 parallel to the axis and positively. These lugs 76 are constructed, for example, of brackets, which are provided in the middle with a slot 77 and, as a result, can act elastically and in a compensating manner as required.

As is evident from FIG. 1, the housing 9 has in its interior one or more chamber 78, which are directed parallel to the axis and connected to an outlet 79, which is in the wall 80 of the housing and directed transversely to the longitudinal median axis 12. When the control valve 10 is opened, the exhaust gases, which are to be controlled and come from an exhaust gas recycling pipeline, pass in the direction of arrow 11 through the openings 15, 45 into the housing chambers 78, from which the exhaust gas emerges from outlet 79 transversely to the longitudinal median axis 12 in the direction of arrow 13. Above this, the housing 9 contains an internal, for example, ring-shaped cooling channel 81, to which coolant is supplied, for example, parallel to the axis at one place and discharged, for example, radially at a different place. In the housing 9, above the housing chambers 78, a spring 82, which surrounds the adjusting shaft 67 and is in the form of a leg spring, is disposed and, with one end, engages the housing 9 and, with the other end, the adjusting shaft 67. The spring 82 functions as a safety spring which, in the case of a possible breakdown of the driving device 68, moves the second valve part 44 into the closed position or, if desired, into the open position.

In the case of the second example, shown in FIG. 11, the same reference symbols are used as in the first example, so that reference is made to the description of the first example in order to avoid repetitions. In addition, the control valve, with respect to valve part 14 and 44, is indicated only diagrammatically, the detailed representation of FIG. 1 being omitted. Nevertheless, the construction of the valve parts 14, 44 is identical with that of the first example, as are the arrangement in the housing 9 and the adjusting shaft 67, as well as the connection of the latter with the second valve part 44. Because of all these details, reference is made to the description of the first example.

The special feature of the second example of FIG. 11 lies therein that, for supplying the exhaust gases, two transporting canals 83, 84, which are separate from one another and in each case are assigned to a cylinder bank of an internal combustion engine, the details of which are not shown, are disposed upstream from the first valve part 14 and the second valve part 44. Until they meet the second valve part 44, the two transporting channels 83, 84 are kept separate from one another, so that there is no mixing of the exhaust gases, supplied in the direction of the arrows in the transporting channels 83, 84 and no effect on the cylinder banks due to the different pressure conditions of the exhaust gases. The transporting channels 83, 84 are separated from one another by a web 85, which extends up to the lower end of the adjusting shaft 67, there being a small gap in order to maintain rotational adjustability.

In the case of the two examples, it can be seen that webs, which, protrude on one axial side of the valve part 14 or 44, surround these openings 15 or 45 and, with their narrow surfaces, form supporting surfaces for the other valve part 44 or 14, which is constructed flat on its facing side 46 or 17 and essentially rests with this surface on the narrow surfaces of the webs, extend along the boundary edges 18, 19, 20 or 48, 49 surrounding the passages 15, 45 of the one valve part 14 or 44. In the case of an example, which is not shown, the relationships of the two valve parts 14, 44, can be exchanged kinematically and selected in such a manner that, instead of the first valve part 14, the second valve part 44, along the boundary edges 48, 49, surrounding the passages 45, especially along the edges forming the boundary of the wing edges, has webs, which protrude over an axial side of the valve part 44 and form with their free narrow surfaces supporting surfaces for the valve part 14. In this case, the first valve part 14 is constructed flat on the side 17, facing the second valve part 44, the second valve part 44 essentially resting with the narrow surfaces of the webs on these flat surfaces 17. In the case of a relative rotational adjustment, the second valve part 44 slides with these narrow surfaces on the flat surface 17 of the first valve part 14. The above explanations flow apply here for the webs provided for the second valve part 44. In the center, in the region of the boreholes 70, the second valve part 44 may also be raised in the same manner.

For the first example, the annular land 24 and/or the annular hub 26 and/or the webs 21, 22, 23 can have a height of at least 0.5 mm. Between the mutually-contacting surfaces of the two valve pairs 14, 44, especially between the supporting surfaces of the web 21, 22, 23 and the annular land on the one hand and the side 46 of the other valve part 44, facing these, on the other, a distance of 0 to 0.1 mm may be maintained constantly. This is accomplished for example, by means of a spacer, such as an annular spacer, or by an annular hub 26 of appropriate height, disposed between the two valve parts 14, 44. In the case of a kinematic exchange, the same applies then for the configuration of the protruding webs of the second valve part 44, forming the edge of the wing edges, and an annular hub present in the region of the borehole 70.

In the case of a different example, which is not shown, at least the second valve part 44 consists of a metal, such as steel. In this case, the second valve part 44 can be connected directly with the adjusting shaft 67, for example, by means of a positive connection, an axial force, which causes the second valve part 44 to be pressed against the first valve part 14, then being exerted on the adjusting shaft 67. In addition or instead, the first valve part 14 can also be formed from a metal, such as steel. If the one or the other valve part 14 or 44 is constructed from a metal, such as steel, the annual hub 26 of the first valve part 14 can then, in an advantageous manner, be constructed as an annual seal for the adjusting shaft 67, which is passed through. Alternatively, if the second valve part 44 is provided with protruding webs and, in the region of the borehole 70, with a protruding annular hub, then the latter can be constructed as an annular seal for sealing appropriately.

What is claimed is:

1. A control valve for controlled recycling of exhaust gases to an intake manifold of an internal combustion engine, comprising two valve parts, which rest on one another with one side, the valve parts each having passages, and being rotatable relative to one another between an open position permitting the passage of exhaust gases and a closed position blocking the passage, wherein webs, which protrude on one axial side of a first of said valve parts, surround the passages and, with their free narrow surfaces, form supporting surfaces for the second valve part, which is constructed flat on its side facing the first valve part and essentially rests with this flat surface on the narrow surfaces of the webs and slides during the relative rotational adjustment, extend along boundary edges surrounding the passages of the first valve part.

2. The control valve of claim 1, wherein the first valve part is constructed as a circular disk and has an annular land which extends along the circular edge, protrudes as far as the webs and, with its narrow surface, forms a supporting surface for the second valve part, which rests and slides thereon.

3. The control valve of claim 2, wherein the first valve part has a center borehole, which is surrounded by an annular hub, which protrudes as far as the webs, and, with its narrow surface, forms a supporting surface for the second valve part, which rests and slides thereon.

4. The control valve of claim 1, wherein the passages of the valve parts are constructed approximately in the form of triangular segments in such a manner that two sides of the triangle extend approximately radially from the center and the further side of the triangle is formed by the arc section of a circular edge.

5. The control valve of claim 4, wherein one of said approximately radial sides extends linearly and approximately along a diameter.

6. The control valve of claim 5, wherein the other approximately radial side extends in arc fashion.

7. The control valve of claim 6, wherein the radial side of the triangle extending in arc fashion is pre-curved towards the radial linear side of the triangle.

8. The control valve of claim 3, wherein, for the first valve part, the annular land and/or the annular hub and/or the webs are constructed with a sharp edge at least along one edge.

9. The control valve of claim 8, wherein the annular land and/or the annular hub and/or the webs have a height of at least 0.5 mm.

10. The control valve of claim 8, wherein, between mutually contacting surfaces of the webs and of the annular land of the first valve part and said side of the other valve part facing the first valve part, a distance of between 0 and 0.1 mm is maintained by means of a spacer disposed between the two valve parts or by said annular hub.

11. The control valve of claim 1, wherein the passages number three and are disposed at equal angular distances from one another.

12. The control valve of claim 1, wherein the passages of the second valve part correspond with respect to shape, size and spatial arrangement, to the passages of the first valve part.

13. The control valve of claim 1, wherein the first valve part is stationary and the second valve part is rotatable relative to the first valve part.

14. The control valve of claim 1, wherein the second valve part is a disk having circumferentially spaced wings and said passages thereof are open radially to the outside and are in the form of approximately V-shaped spaces between adjacent ones of said wings.

15. The control valve of claim 13, wherein the rotatability of the second valve part relative to the first valve part comprises rotation in one direction from a closed position of the valve to an open position of the valve and, in an opposite direction back to the closed position.

16. The control valve of claim 15, wherein the respective passages of the second valve part comprise an arc-shaped boundary edge which is pre-arched in the opening direction, the arc-shaped boundary edge comprising a leading edge and a linear rear boundary edge of the respective passages trails during the movement into the open position and provides a thereby increasing size of a cross-section of the passages in the first part of the valve.

17. The control valve of claim 16, wherein the the leading edge and surfaces of the second valve part adjacent thereto, during the movement in the opening direction, slide on surfaces of the first valve part and act as a scraping tool for scraping off any adhering particles.

18. The control valve of claim 17, wherein the second valve part, in a radially outer transition region of the arc-shaped boundary edge, has a nose which protrudes in the opening direction of rotation into an adjoining edge that is in the shape of a circular section, slides during the movement in the opening direction on the annular land of the first valve part and acts as a scraping tool for scraping off any adhering particles.

19. The control valve of claim 18, wherein the linear rear boundary edge, during the movement back into the closed position, acts as a scraping tool for scraping off any adhering particles.

20. The control valve of claim 19, wherein the relationships of the two valve parts are kinematically exchanged so that the second valve part, along said leading and rear boundary edges, has webs which protrude towards an axial side of the second valve part and, with their free narrow surfaces, form supporting surfaces for the first valve part, which is constructed flat on its side facing the second valve part and, with this flat surface essentially lies against the narrow surfaces of said webs along said leading and rear boundary edges, the second valve part, during the relative rotational adjustment, sliding with its narrow surfaces on the flat surface of the first valve part.

21. The control valve of claim 20, further comprising a housing within which the valve parts are housed and wherein the first valve part is inserted into the front side of the housing.

22. The control valve of claim 21, wherein the second valve part rests on the narrow surfaces of the first valve part on the side of the first valve part averted from the housing.

23. The control valve of claim 22, wherein an end of the housing has one or more projections which protrude over the second valve part and protect the valve parts.

24. The control valve of claim 23, wherein the first valve part, on a side averted from the second valve part, is prevented from rotating in relation to the housing by means of positive connecting means.

25. The control valve of claim 24, wherein the connecting means are formed by at least one projection which is approximately parallel to the axis of said rotation, and by seats in the housing or the first valve part which, when the first valve part is inserted, engage one another.

26. The control valve of claim 25, wherein the second valve part is held in a floating manner and is connected with a control shaft, which is drivable by a driving device.

27. The control valve of claim 26, wherein the control shaft passes through the central borehole of the first valve part and, furthermore, through a central borehole in the second valve part with which it is coupled outside the second valve part.

28. The control valve of claim 27, wherein a connecting element, which overlaps the outside of the second valve part, averted from the first valve part and is rotationally locked with the second valve part, is fastened, to the control shaft.

29. The control valve of claim 28, wherein the second valve part is pressed by means of a spring applying an axial spring force against the side of the first valve part facing the second valve part.

30. The control valve of claim 29, wherein the connecting element comprises the spring.

31. The control valve of claim 30, wherein the connecting element comprises a plurality of radially-protruding, approximately leaf-spring-like arms and a non-elastic center.

32. The control valve of claim 31, wherein the second valve part, on the outside, has seats and the connecting element has lugs which engage the seats.

33. The control valve of claim 32, wherein the lugs are disposed at the ends of the arms, from which they protrude approximately at right angles, and approximately parallel to said axis, engage the seats of the second valve part.

34. The control valve of claim 33, wherein the seats comprise radially directed, blind hole-like elongated holes.

35. The control valve of claim 1, wherein the first valve part and/or the second valve part are of ceramic.

36. The control valve of claim 34, wherein at least the second valve part is of a metal and the second valve part is connected to the control shaft by a positive connection.

37. The control valve of claim 36, wherein the surfaces of the two valve parts which are in contact have different roughnesses.

38. The control valve of claim 37, wherein the first valve part is of a metal and the annular hub of the first valve part or of the second valve part is of a metal and forms an annular seal for sealing in relation to the control shaft.

39. The control valve of claim 38, wherein an interior of the housing has at least one chamber, which is directed approximately parallel to an axis of the housing and connected with an outlet in a wall of the housing, the outlet being directed transversely to the housing axis.

40. The control valve of claim 39, wherein the housing contains an internal cooling channel to which coolant is supplied and from which coolant is discharged.

41. The control valve of claim 40, wherein the adjusting shaft extends from the driving device without a coupling up to the connecting element.

42. The control valve of claim 41, further comprising two separate transporting channels, which are separate from one another and supply exhaust gases and in each case are assigned to a cylinder bank of an internal combustion engine, said channels being upstream of the first valve part and the second valve part.

* * * * *